Figure 1:
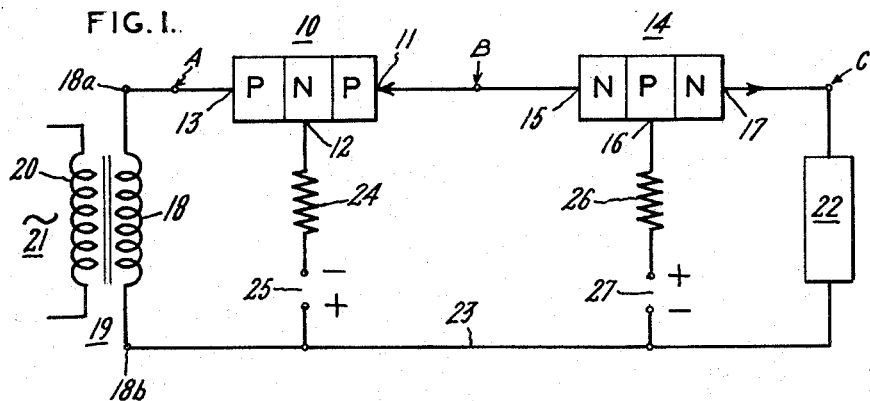

Oct. 29, 1963    R. G. GOLDMAN    3,109,135
TRANSISTORIZED VOLTAGE REGULATOR
Filed Dec. 9, 1960

United States Patent Office 3,109,135
Patented Oct. 29, 1963

3,109,135
TRANSISTORIZED VOLTAGE REGULATOR
Richard G. Goldman, Schenectady, N.Y., assignor to General Electric Company, a corporation of New York
Filed Dec. 9, 1960, Ser. No. 74,991
6 Claims. (Cl. 323—22)

The present invention relates to a transistorized voltage amplitude regulator for pulsating voltages such as an A.C. voltage or a pulsating D.C. voltage.

Voltage amplitude regulators for A.C. or D.C. voltages are very well known in the art. It is also known in the art to employ transistors in such regulators. Nevertheless, there is still a need for small but efficient and compactly designed regulators. In the modern development of aeronautics and astronautics, weight is of the essence particularly in view of the numerous control functions which must be carried out in such vehicles to be lifted from the ground. On the other hand, preciseness and reliability of operation are of much importance in these modern fields. Light weight and reliability appear to require as few elements as possible in any kind of regulator and control apparatus while on the other hand, precise regulation to close tolerances is a requirement which tends to lead to an increase in components to be used. Simply designed transistor circuits usually perform only simple functions at relatively high power loss, such as an amplitude dependent bleeder circuit or a gating circuit, or mere signal transmission.

It is a primary object of the present invention to provide a new and improved transistorized, pulsating voltage amplitude regulator which is of small weight, reliable, but also precise in operation and with a minimum of circuit elements.

It is another object of the present invention to provide a new transistor type of pulsating voltage amplitude regulator, which makes full use of the fact that the emitter-collector path of an appropriately biased transistor can permit current passage in two directions and that the same transistor can serve as a voltage transducer even after cut-off.

It is another object of the invention to provide a new transistorized regulator for A.C. voltage.

It is a further object of the invention to provide a new transistorized amplitude regulator for D.C. voltage pulses which also may serve as a rectifier.

According to one aspect of the invention in a preferred embodiment thereof, the voltage regulator may comprise a transistor with conventional emitter, collector and base electrodes. A load and an A.C. voltage source are connected in series with the emitter-collector path of this transistor. The base of this transistor is biased in the forward direction with respect to the emitter thereof whereby a base-load circuit is established, and asymmetrically conductive means are inserted in this base-load circuit of this transistor for modifying the biasing effect of the base bias within a predetermined A.C. voltage range in which two P-N junctions of the transistor are forward biased, whereby the base bias itself does not cause cutoff of the collector current. This latter asymmetrical conductive means can be a second transistor connected in series circuit connection with the load and the first mentioned transistor, whereby the emitter-base P-N junctions of the two transistors, as effective in the circuit when unbiased, permit forward current in opposite directions only; the base bias of the second transistor corresponds to the base bias of the first transistor. In this case, the regulator serves as an A.C. voltage amplitude regulator.

According to another embodiment of the invention, the above-mentioned asymmetrical conductive means can be a rectifying element connected to the base in such a direction as to oppose current in the forward direction of any of the P-N junctions of the transistor. In this case, the regulator serves as a pulsating D.C. voltage amplitude regulator, fed from an A.C. source.

Figure 2:
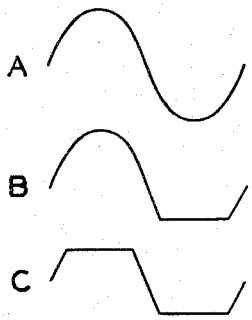
Figure 3:
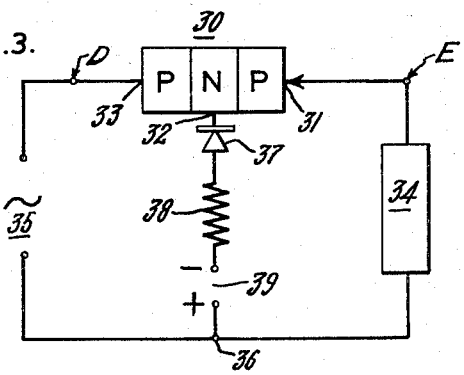
Figure 4:
Figure 5:
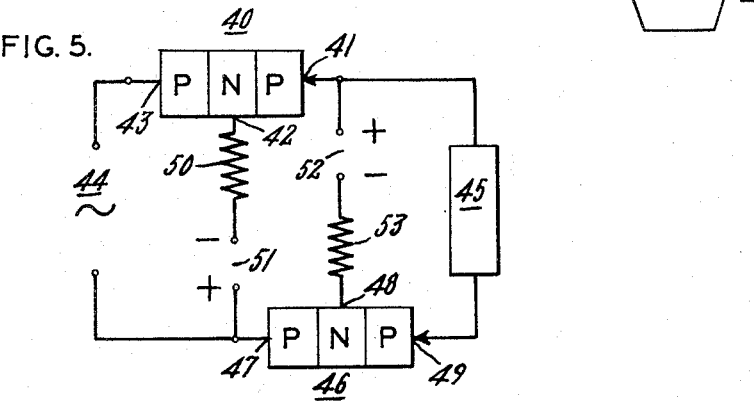

The invention, the objects of the invention, and further objects and advantages of the invention will be understood best from the following description taken in connection with the accompanying drawing in which:

FIG. 1 is a circuit diagram of an A.C. voltage amplitude regulator according to the invention;

FIG. 2 includes three voltage diagrams taken at various points of the circuit shown in FIG. 1 during operation thereof;

FIG. 3 is a circuit diagram of a D.C. pulsating voltage amplitude regulator according to the invention;

FIG. 4 includes two voltage diagrams taken at two different points in the circuit shown in FIG. 3; and FIG. 5 is a modification of the circuit diagram shown in FIG. 1.

In FIG. 1, a P-N-P transistor 10 has emitter 11, base 12 and collector 13. The emitter 11 is connected to another transistor 14 of complementary, i.e., N-P-N type, particularly collector 15 thereof. Base 16 and emitter 17 complete this transistor 14. Collector 13 of transistor 10 is further connected to terminal 18a of secondary winding 18 pertaining to a transformer 19, having a primary winding 20 connected to a suitable A.C. voltage source 21 for the power input. The lower terminal (18b) of secondary 18 is connected to a load 22 via a line 23, which load in turn is also connected to emitter 17 of transistor 14 to complete the current supply circuit for this load 22. Base 12 of P-N-P transistor 10 is connected to line 23 via a base current limiting resistor 24 connected in series with a D.C. voltage biasing source 25, for example a battery, whereby the positive terminal of voltage source 25 is connected to line 23 and the negative terminal is connected to resistor 24 for negatively biasing base 12. Base 16 of N-P-N transistor 14 is also connected to line 23 via a series circuit connection of a base current limiting resistor 26 and a D.C. voltage biasing source 27. The polarity of voltage source 27 as it is effective in this network is to bias base 16 positive with respect to line 23. The device as described thus far basically includes a series circuit connection of base biased transistor 10, load 22 and A.C. voltage supply terminals 18a, 18b. Base biased transistor 14 is an asymmetrically conductive element which is effective in the circuit established by base of transistor 10 and the bias thereof, and the load 22.

The entire circuit according to the foregoing operates as follows:

With no voltage across secondary 18, both the emitter-base junction of transistor 10 and the base collector junction of transistor 14 are biased in the forward direction and form a closed current path supplied by the two voltage sources 25 and 27 which, for this purpose, operate as series connected voltage supply sources. If the voltage across secondary 18 now swings up to render terminal 18a (coinciding with a point A with respect to potential) positive with respect to line 23, the collector 13 of PNP transistor 10 is rendered positive while the base remains biased negative and thus a saturation current quickly is established from collector to emitter of transistor 10 whereby the emitter 11 assumes substantially the potential of point A. This in turn means that the positive wave passes through transistor 10 and a complete positive half wave appears at point B. It will be apparent, however, that this positive voltage as it now appears at the collector 15 of NPN transistor 14 operates to oppose the forward collector bias and a load current flows from collector 15 to emitter 17; this, however, can only occur as long as the potential of emitter 17 is not more positive than the positively biased base. When the potential of emitter 17 has reached that point, cutoff begins to occur and, as shown at C in FIG. 2, the potential of emitter 17 remains constant at base bias voltage level. When the positive half wave at secondary 18 swings back to zero, the potentials at points B and C follow accordingly. It will be apparent from the foregoing that transistor 14 in clipping the positive half wave modifies the biasing effect of the base bias of transistor 10 which base bias permitted unimpaired passage of this positive half wave.

If now the voltage across 18 and particularly at point A thereof, swings to the negative, the collector 13 at first is still more positive relative to the negatively biased base, and emitter 11 assumes substantially the same potential as collector 13; thus, as shown in FIG. 2B the voltage at B becomes negative with respect to line 23 until this voltage is similar to the negative base bias at which point cutoff begins to occur, and in spite of the continuing negative voltage swing at point A, the potential at point B remains constant at a level determined by the base bias. A negative potential at point B, and at collector 15, does not alter the forward bias of the PN junction of base collector path of transistor 14 and therefore emitter 17 assumes substantially the potential of the collector. Thus, the negative voltage of point B passes substantially unimpaired through transistor 14 and appears at point C across the load 22.

As it will be apparent from the foregoing, the amplitude of the voltage appearing between point C and line 23, i.e. across the load 22, depends on the base bias voltages for transistors 10 and 14 and fluctuations of the voltage amplitude as it appears across secondary 18 are not transmitted to the load. The crcuit as shown has the particularly interesting feature that, for any voltage section permitted to pass through the transistors, every PN junction is biased in the forward direction. This in turn means that the current losses in these transistors are relatively low, and inasmuch as this circuit does not employ any series resistor other than the load resistor, this circuit is particularly suitable for a relatively high power level.

The embodiment of the invention shown in FIG. 3 will regulate the amplitude of unidirectional voltage pulses. A single transistor 30, having emitter 31, base 32 and collector 33 is connected with its emitter-collector path in series with a load 34 and an A.C. voltage power source 35 of any kind. Base 32 is connected to junction 36 of load 34 and voltage source 35, via a series circuit connection of a diode 37, a resistor 38 and a D.C. voltage biasing source 39. Diode 37 is of such polarity as to permit current to, but not from base 32, other than a leakage current; voltage source 39 is, however, poled so as to draw current from base 32. In this embodiment, diode 37 is the asymmetrically conductive element inserted in the base-load circuit as established by base 32 of transistor 30 and load 34.

The circuit shown in FIG. 3 operates as follows:

If the potential at D is substantially the same as the potential of junction 36; i.e. if no voltage is generated across the terminals of source 35, emitter 31 is slightly positively biased with respect to the base 32, but the biasing current is determined by the reverse leakage current of diode 37. If, now, a half wave voltage appears across source 35 and renders point D and collector 33 positive with respect to junction 36, emitter 31 and base 32 are shifted to a negative potential with respect to collector 33. No collector-emitter current flow can occur because the forward current through the emitter-base PN junction is too small to allow any collector current, and thus the voltage across load 34 remains substantially zero during the positive half wave. The bias source 39 would permit a saturation current as in transistor 10 of FIG. 1 but reversely poled diode 37 prevents it. If, now, the voltage across voltage source 35 and particularly the potential at point D swings to the negative with respect to junction 36, transistor 30 is opened, to the extent permitted by reverse bias current through diode 37, and operates as an emitter-follower whereby emitter 31 assumes substantially collector potential, i.e. the voltage potential at point E also drops negative with respect to junction 36. This, however, occurs only until the collector potential is substantially equal to the potential of the negative terminal of D.C. bias source 39. When the potential at D drops more to the negative, cutoff begins to occur and the potential at point E, i.e. the voltage across load 34, remains substantially constant until the voltage across 35 swings back to zero, followed by the voltage across load 34.

It is apparent that the voltage across the load 34 is unidirectional for all practical purposes and of substantially constant amplitude as determined by the biasing voltage source 39. It is further apparent that diode 37 does not carry any load current and need only be designed to withstand the relatively small reverse voltage at times when the collector voltage is positive.

The circuit network shown in FIG. 5 is a modification of the circuit shown in FIG. 1 enabling the use of two transistors of the same type instead of complementary transistors as shown in FIG. 1. A first transistor 40, having emitter 41, base 42 and collector 43, is connected with its collector 43 to one terminal of an A.C. voltage source 44, while emitter 41 is connected to a load 45. The other terminal of voltage source 44 is connected to a second transistor 46, particularly collector 47 thereof. Transistor 46 is completed by base 48 and emitter 49, the latter being connected to load 45. The two transistors 40 and 46 are both of the PNP type. A base current limiting resistor 50 is connected to base 42 of transistor 40 and to the negative terminal of a D.C. biasing voltage source 51, the positive terminal of which is connected to the junction of collector 47 and the A.C. voltage source 44. The junction of emitter 41 and load 45 is connected to the positive terminal of another D.C. voltage source 52 the negative terminal of which is connected to a base current limiting resistor 53, which in turn is connected to base 48.

The operation of this circuit shown in FIG. 5 will be understood best if the operation of transistor 10 of FIG. 1 is recalled. The base biased transistor 40 permits complete passage of that one of the A.C. voltage half waves, which renders collector 43 positive with respect to collector 47, while the other half wave is limited at a value determined by the base biasing voltage 51. Base biased transistor 46 operates in exactly the same fashion but affects opposite half waves as compared with the effect exerted by transistor 40, whereby the voltage source 52 determines the magnitude of the half wave which was passed unimpaired by transistor 40. Thus, a voltage appears across load 45 corresponding to curve C in FIG. 2.

It will be appreciated that in the circuit shown in FIG. 5 one could susbtitute NPN transistors for PNP transistors and in that case the polarities of D.C. voltage sources 51 and 53 will have to be reversed. It is, of course, intended to cover in the appended claims all such modifications as fall within the true spirit and scope of the invention.

What I claim as new and desire to secure by Letters Patent of the United States is:

1. A transistorized pulsating voltage amplitude regulator comprising a transistor having base, emitter and collector electrodes, a load, an A.C. input voltage source, means for connecting said A.C. voltage source in series circuit connection with the emitter-collector path of said transistor and said load whereby a junction between said load and said A.C. source is established, means connected between said junction and said base for forward biasing said base with respect to said emitter whereby a base-load circuit is established, and asymmetrical conductive means inserted in said base-load circuit for modifying the biasing effect of said biasing means within a predetermined A.C. voltage range.

2. A transistorized pulsating voltage amplitude regulator comprising a transistor having base, emitter and collector electrodes, a load, means for connecting said load to one of said emitter and collector electrodes, an A.C. input voltage source having a first terminal collected to the other one of said emitter and collector electrodes, and having a second terminal connected to said load, a D.C. voltage source, means for connecting said D.C. voltage source between said base and said second terminal with such polarity to forward bias any of the PN junctions of said transistor; and asymmetrical conductive means inserted between said emitter and said base in series circuit connection with said D.C. voltage source for modifying the biasing effect of said D.C. voltage source whenever the voltage potential at said first terminal tends to increase the forward bias of the electrode to which it is connected.

3. An A.C. voltage amplitude regulator comprising a first transistor having base, emitter and collector electrodes and having PN junctions, a second transistor of complementary type with respect to said first transistor, also having base, emitter and collector electrodes, a load, an unregulated A.C. voltage source, means for completing a series circuit network including the collector-emitter path of said first transistor, the collector-emitter path of said second transistor, said load, and said A.C. voltage source, and means for biasing all of said PN junctions of said transistors in the forward direction at a predetermined base bias voltage level.

4. An A.C. voltage regulator as set forth in claim 3, said last-mentioned means including a first D.C. voltage source connected to the base of said first transistor and a second D.C. voltage source connected to the base of said second transistor so as to complete a series circuit with said first D.C. voltage source in positive, additive relationship.

5. An A.C. voltage amplitude regulator comprising a first transistor having base, emitter and collector electrodes, an unregulated A.C. input voltage source, a D.C. voltage source, means for connecting said A.C. voltage source, said D.C. voltage source and the base-collector path of said transistor in series at such a polarity of said D.C. voltage source so as to forward bias the PN junction of said base-collector path, a load, a second conductively base-biased transistor and means for connecting said second transistor in series with said load, said A.C. voltage source, and the emitter-collector path of said first transistor, whereby the emitter base PN junctions of said two transistors are connected for opposite forward current directions.

6. A D.C. voltage regulator comprising an unregulated A.C. voltage source, a transistor having emitter, base, collector electrodes, a load interconnecting in series circuit connection said A.C. voltage source and said transistor, whereby a junction between said A.C. voltage source and said load is formed, a series circuit connection of a D.C. voltage source and a diode of such polarity that said D.C. voltage source can only drive a leakage current through the diode, and means for connecting said last-menttioned series circuit connection between said base and said junction with said diode suppressing forward base current.

References Cited in the file of this patent
UNITED STATES PATENTS
2,980,806    Ort _____ Apr. 18, 1961